May 25, 1943.   P. J. ANDERSON   2,320,024
CULTIVATOR TOOL
Filed Aug. 22, 1940
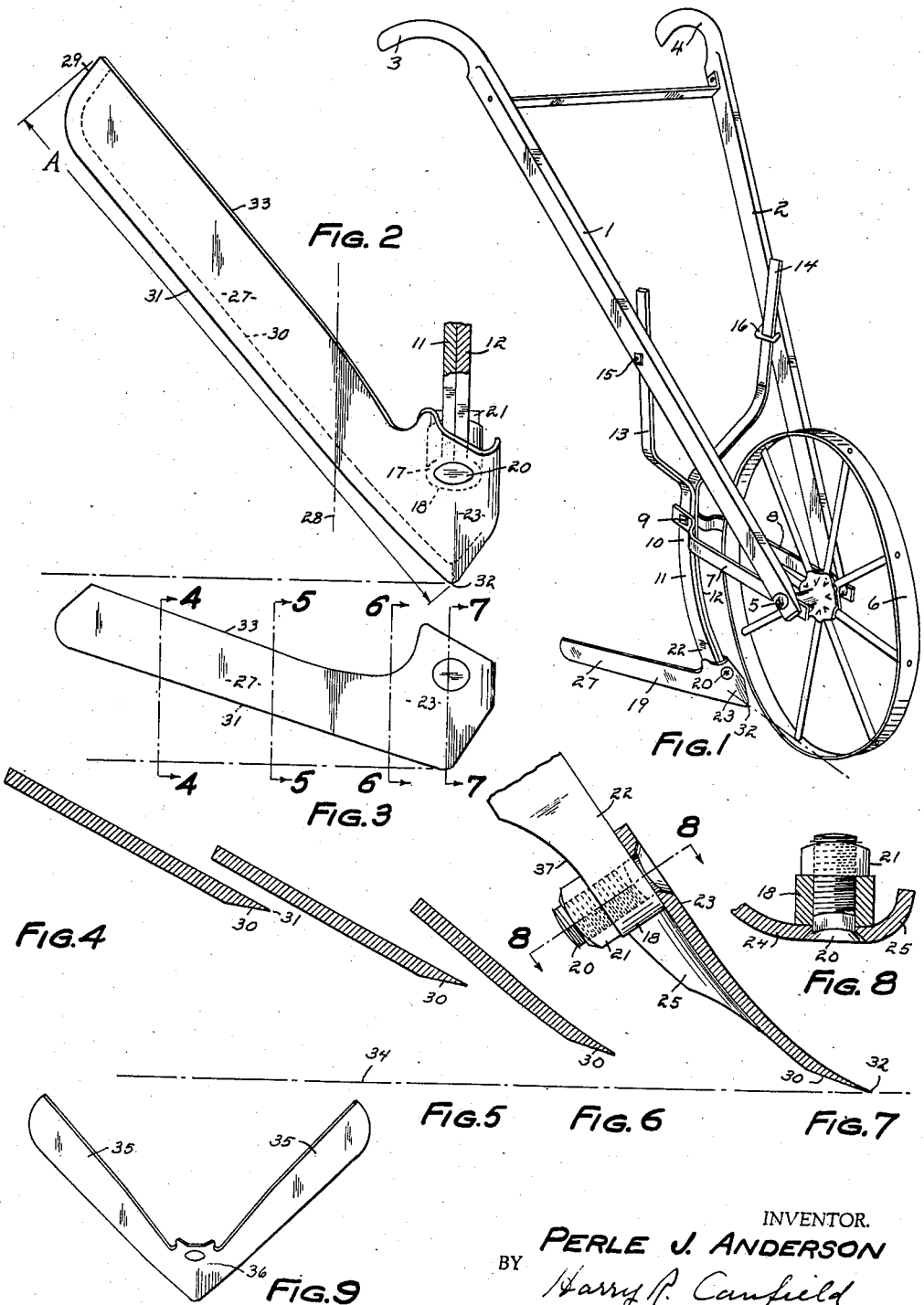
INVENTOR.
PERLE J. ANDERSON
BY Harry P. Canfield
ATTORNEY.

Patented May 25, 1943

2,320,024

UNITED STATES PATENT OFFICE 2,320,024

CULTIVATOR TOOL

Perle Jay Anderson, Portland, N. Y.

Application August 22, 1940, Serial No. 353,701

4 Claims. (Cl. 97—59)

This invention relates to agricultural implements and tools therefor; particularly to ground working tools of the blade type for hand-propelled cultivators.

Heretofore agricultural cultivating implements have been proposed comprising rearwardly extending handles and a forwardly disposed ground wheel and a ground working tool or blade; and various forms of ground working blades have been proposed for implements of this class. The present invention consists of improvements over such prior blade tools, and improvements in the mounting thereof on an implement.

I have found by experiment that such prior blade type tools are objectionable in a number of respects, some of which are: that they are difficult and laborious to propel through the soil; and difficult to maintain at a desired degree of penetration in the soil; and do not tumble the soil in a manner to efficiently mulch the same or uproot and turn over the weeds encountered; and when the tool comprises a single laterally extending blade, which is an advantage for some classes of work, it develops side thrust which must be counteracted by the operator, thereby adding further to the labor of propulsion.

It is the primary object of the present invention to provide a ground working agricultural tool or blade of the type referred to which will overcome the objections to prior tools among which are those mentioned above.

Other objects are:

To provide generally a ground working agricultural tool or blade of the general type referred to and means for mounting it on an agricultural implement to dispose it in optimum ground working position;

To provide a ground working agricultural tool of the blade type having a predetermined position for optimum ground working effect and an agricultural implement for supporting the blade in such optimum position.

Other objects will be apparent to those skilled in the art to which my invention appertains.

My invention is fully disclosed in the following description taken in connection with the accompanying drawing, in which Fig. 1 is a perspective view illustrating an agricultural implement of the forward wheel and rearward handle class, and a blade tool mounted thereon, and embodying my invention, the view illustrating the tool in the position which it occupies when the front wheel and a forward point of the tool are both co-incident with the ground plane;

Fig. 2 is a view of the ground-working tool of Fig. 1, the view being an exact plan view of the tool in the position thereof of Fig. 1, and being drawn to approximately one half full scale for a tool of the preferred size;

Fig. 3 is a view similar to Fig. 2 but in exact front elevation when the tool is in the position of Fig. 1;

Figs. 4, 5, 6 and 7 are cross-sectional views taken from the planes 4—4, 5—5, 6—6, and 7—7 respectively of Fig. 3, and being drawn to approximately full scale for a tool of preferred size;

Fig. 8 is a cross-sectional view taken from the plane 8—8 of Fig. 7;

Fig. 9 is a view illustrating a modification of the tool of Fig. 1, the same being a double-blade tool whereas the tool of Fig. 1 is a single-blade tool.

In the following, my invention will be described in connection with the drawing as to the physical parts thereof and this will be followed by a description of its mode of operation and the features of the construction by which this mode of operation is practiced.

Referring to Fig. 1, I have shown at 1 and 2 a pair of handle bars having handle grips 3 and 4 on the rearward end portions thereof, the bars 1 and 2 extending upwardly rearwardly from an axle bolt 5 upon which is rotatably mounted a ground wheel 6. A triangular rigid frame is provided comprising side bars 7 and 8 mounted on the axle bolt 5, extending rearwardly therefrom at opposite sides of the wheel 6, and connected by a bolt 9 to a standard 10 formed of two pieces of metal bar 11 and 12, which in upper portions thereof are bent laterally to provide spaced-apart uprights 13 and 14 connected respectively to the handle bars 1 and 2. This connection is made adjustable by means of J-bolts 15 and 16 projected through the handle bars 1 and 2, and the hooked ends thereof embracing the uprights 13 and 14, permitting them to slide through the eyes when the bolts are loosened and to clamp them in adjusted position when the bolts are tight, to adjustably change the elevation above the ground of the handle grips 3 and 4.

The standard 10 is preferably made from a single piece of steel bar bent at its middle to provide a double thickness standard, and at the said bent middle portion, as shown at 17 in Fig. 2, an eye 18 is provided.

The tool proper 19, to be described, is mounted on the lower end of the standard 10 by a bolt 20 projected through the tool and through the eye 18 with a nut 21 rearwardly of the eye, these parts also being shown in Figs. 7 and 8.

The lower portion of the standard 10, as at 22, is substantially rectilinear, and its front face is inclined forward at an angle with the ground of the order of 60 degrees. See also Fig. 7.

The tool 19 comprises a forward crown 23 lying upon the lower end 22 of the standard, and curving rearwardly on each side thereof, as at 24 and 25, to grip the same when the nut 21 is drawn tight. The crown 23 is forwardly convex and has an extreme forward point 32.

The left side of the crown 23 (as viewed in the drawing) continues into a wing or blade 27, the forwardly convex part of the crown merging at approximately a line 28 (see Fig. 2), into the blade, from which point outwardly to the end 29 of the blade, it is substantially planar.

The tool on its underside is beveled, for example by means of a die, to provide a sharp edge on all of the most forward portions of the tool, the bevel being indicated in dotted line in Fig. 2 at 30, and being shown in Figs. 4 to 7, to be referred to.

The cross-sectional configuration and position of the parts of the tool is illustrated in Figs. 4 to 7 by cross-sectional views, taken at selected points of the blade, as indicated in Fig. 3.

As will be seen from the plan view of Fig. 2, the forward cutting edge 31 of the blade extends laterally rearwardly at an angle of approximately 45 degrees with the forward direction of travel, when the tool 19 and the wheel 6 are propelled forwardly by the operator thereof pushing upon the handle grips 3 and 4; and as shown in Fig. 3, the forward cutting edge 31 extends upwardly laterally at an angle of approximately 20 degrees with the ground when viewed in front elevation; and the forward upper part or main part of the crown extends upwardly rearwardly at an angle to the ground of approximately 60 degrees, as shown in Fig. 7; and the blade 27 lies at approximately 35 degrees with the ground, as shown in Figs. 4 and 5; these angles being considered with the wheel 6 and the point 32 of the blade both on the ground plane.

A suitable size for the blade is shown in cross-section in Figs. 4 to 7 and to one-half full size in Figs. 2 and 3, and in length it may have an overall dimension A of 11 inches full size.

The cutting edge 31 and correspondingly the other working parts of the blade are thus seen to be disposed at an angle to the ground surface, and also at an angle to the forward direction of travel; and this angular position of the blade is maintained by the angular direction of the lower end of the standard 22, and the engagement of the rearward or concave configuration of the crown 23 therewith; and as will be understood, the lower end portion 22 of the standard is disposed at such angle with the ground that the blade will have the above described angular positions when, as stated, the point 32 of the tool and the ground engaging portion of the wheel 6 are both upon the plane of the ground.

When the implement is propelled forwardly the point 32 and crown 23 of the blade penetrate the soil to different depths to be referred to, and as will be apparent at each different depth, the aforesaid angular relations are different, and it is for this reason that the said angles have been described as related to a definite position of the blade, namely that from which it starts into operation, and which as aforesaid is the position in which the point 32 is at the ground plane.

As stated hereinbefore, the forwardly convex crown 23 merges into the rearward planar portion of the blade 27 proper, approximately at the line 28, and this line is approximately parallel with the forward direction of travel and located about one-third of the distance from the point 32 of the tool to the extreme rearward end, as viewed in Fig. 2; and the change of contour effected at this line may be referred to as a twist in the blade.

In the operation of the implement and blade above described, upon propelling the implement forwardly, with the point 32 of the tool resting upon the ground, the tool readily penetrates into the soil by the action well known in agricultural implements as suction. No down pressure by the operator upon the handle grips 3 and 4 is necessary to effect this suction, the form of the tool causing it to float in the soil with the cutting edge thereof below the surface of the soil. By exerting a slight upward or downward force on the handle grips the depth at which the tool works may be varied.

As the tool moves forwardly through the ground, the cutting edge 31 slides and cuts through the soil and raises the soil causing it to tumble over the back edge 33 of the blade, which has the double effect of breaking up the soil into a fine mulch and also of turning over weeds the roots of which have been torn out by the blade. The crown 23 has the effect of breaking the soil in the nature of a plow. The cutting action of the edge 31 is a free slicing action.

The angle of the blade with respect to the ground as shown in Figs. 4 to 7, becomes less and less as the tool penetrates more and more into the ground and by providing such angle as shown in Figs. 4 to 7, and the angles of Figs. 2 and 3, side thrust of the blade is rendered negligible, and little side thrust therefore is communicated to the handle grips 3 and 4, where otherwise it would have to be counteracted by the operator.

The aforesaid twist in the blade is apparent in going backward from Fig. 7 to Fig. 4 where, as shown, the angle of the blade proper with the ground line 34, is less than that of the crown. Obviously the deeper the penetration at which the tool works the flatter will this angle become, which is important as eliminating side thrust, and as off-setting and neutralizing the greater propulsion force which would otherwise be necessary because of the greater depth of penetration. Thus at little penetration the blade presents a steep angle to the ground (referring to Figs. 4 to 7) and at deep penetration a lesser angle to the ground, resulting in the minimum of propulsion force necessary and likewise a minimum of side thrust at all depths of penetration.

From the foregoing it will be seen that in general the tool is self-penetrating; it tumbles the soil and the weeds are torn loose and turned over; it produces a fine mulch; it slices through the soil and weeds freely; and reacts with the minimum of load upon the handle grips 3 and 4, and with the minimum of side thrust at all depths of penetration; and tends to float in the soil at each depth.

Since as explained hereinbefore the side thrust of the blade is of negligible amount, the tool as a whole may be readily shifted from side to side as it progresses forwardly, whereby the blade may be moved laterally in between plants in a row and out again with convenience and efficiency.

For some classes of work a double wing blade may be desired as shown in Fig. 9, wherein two wings 35—35 are shown having a common crown 36, and the crown 36 and each of the wings 35 may be constructed as described above for the single wing blade; and the operation of both wings will be substantially the same as that described above for one wing.

My invention is not limited to the exact details of construction illustrated and described nor to the exact angular relations referred to and illustrated in the figures of the drawing; these angular relations being those preferred. Other changes and modifications may be made within the spirit of my invention without sacrificing its advantages and within the scope of the appended claims.

I claim:

1. A cultivator tool for cultivators of the type comprising a ground wheel and a downwardly forwardly projecting tool standard, the tool comprising a forward crown adapted to be rigidly mounted on the standard, and the forward face of the crown being transversely convexly curved, and upwardly rearwardly inclined at an angle to the ground of the order of 60 degrees, and the lower portion of the crown having a forward point, the tool having a blade body extending laterally rearwardly from the crown and bodily inclined upwardly from the ground plane, and the crown and the blade having a forward cutting edge which when projected upon the ground plane makes an angle of the order of 45 degrees with a vertical plane parallel with the forward direction of travel of the tool, and which edge inclines upwardly from the ground plane at an angle of the order of 20 degrees, the blade body sloping upwardly rearwardly from the blade cutting edge, at angles of the order of 35 degrees with the ground plane on blade intersecting vertical planes parallel to the forward direction of travel, the aforesaid angles being considered with the point of the crown and the wheel rim on the ground plane.

2. The cultivator tool described in claim 1 and in which the said blade is substantially planar and merges into the crown substantially on a line in a vertical plane parallel with the forward direction of travel of the tool.

3. The cultivator tool described in claim 1 and in which the blade of the tool joins the crown approximately on a line substantially in a vertical plane parallel with the forward direction of travel of the tool, and which plane is approximately one-third of the distance from the point of the crown to the extreme rearward end of the blade measured in the direction at right angles to the forward direction of travel.

4. A cultivator tool for cultivators of the type comprising a ground wheel and a downwardly forwardly projecting tool standard; the tool comprising a forward crown adapted to be rigidly mounted on the standard; and the forward face of the crown being transversely convexly rounded and upwardly rearwardly inclined at an angle to the ground, and the lower portion of the crown having a forward point, and the crown, proceeding upwardly from the point, being forwardly concave; the tool having a blade body extending laterally from the crown; and the crown and blade body having a forward cutting edge which extends laterally rearwardly at generally an angle with the forward direction of travel of the tool and at an angle with the ground plane; and the blade body sloping upwardly rearwardly from the blade cutting edge at an angle with the ground plane; the said angles with the ground plane being considered with the tool point and ground wheel on the ground plane; the blade being substantially planar and its said angle with the ground being less than the said angular inclination of the crown with the ground plane; the blade body merging into the aforesaid crown substantially on a line in a vertical plane which is substantially parallel with the forward direction of travel of the tool, and adjacent to the crown.

PERLE JAY ANDERSON.